(12) United States Patent
Kitayama et al.

(10) Patent No.: US 10,967,543 B2
(45) Date of Patent: Apr. 6, 2021

(54) RESIN MOLDING APPARATUS

(71) Applicant: HONDA MOTOR CO., LTD., Tokyo (JP)

(72) Inventors: Kenichi Kitayama, Wako (JP); Masaya Kuroiwa, Wako (JP); Takeshi Shimizu, Tokyo (JP); Mitsuharu Kan, Wako (JP); Kazumi Miyake, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/478,598

(22) PCT Filed: Jan. 18, 2017

(86) PCT No.: PCT/JP2017/001454
§ 371 (c)(1),
(2) Date: Jul. 17, 2019

(87) PCT Pub. No.: WO2018/134900
PCT Pub. Date: Jul. 26, 2018

(65) Prior Publication Data
US 2020/0031022 A1 Jan. 30, 2020

(51) Int. Cl.
| | |
|---|---|
| *B29C 33/02* | (2006.01) |
| *B29C 43/02* | (2006.01) |
| *B29C 43/34* | (2006.01) |
| *B29C 45/73* | (2006.01) |
| *B29C 45/14* | (2006.01) |
| *B29K 21/00* | (2006.01) |

(52) U.S. Cl.
CPC .............. *B29C 33/02* (2013.01); *B29C 43/02* (2013.01); *B29C 43/34* (2013.01); *B29C 45/73* (2013.01); *B29C 2045/14155* (2013.01); *B29K 2021/003* (2013.01)

(58) Field of Classification Search
CPC ......... B29C 33/02; B29C 43/02; B29C 43/34; B29C 45/73; B29C 2045/14155; B29K 2021/003
See application file for complete search history.

(56) References Cited

FOREIGN PATENT DOCUMENTS

| JP | 03236921 A | * | 10/1991 | ......... B29C 45/1418 |
|---|---|---|---|---|
| JP | H03-236921 A | | 10/1991 | |
| JP | 11147251 A | * | 6/1999 | |

(Continued)

OTHER PUBLICATIONS

International Search Report by ISA/JP dated Mar. 7, 2017, on PCT/JP2017/001454 (2 pages).

(Continued)

*Primary Examiner* — Joseph S Del Sole
*Assistant Examiner* — Yung-Sheng M Tsui
(74) *Attorney, Agent, or Firm* — Rankin, Hill & Clark LLP

(57) ABSTRACT

A resin molding apparatus provided with a first mold and a second mold for pressing a flat thermoplastic resin sheet into a molded article, wherein the molded article has a shape provided with a flat plate part and a concave-convex part continuous with the flat plate part, and a heating part is provided to locally heat a concave-convex molding region corresponding to the concave-convex part in the thermoplastic resin sheet when the thermoplastic resin sheet is pressed.

16 Claims, 11 Drawing Sheets

(56) References Cited

FOREIGN PATENT DOCUMENTS

| | | |
|---|---|---|
| JP | H11-147251 A | 6/1999 |
| JP | 2000-158469 A | 6/2000 |
| JP | 2004-323022 A | 11/2004 |
| JP | 2004323022 A * | 11/2004 |
| JP | 2005-125534 A | 5/2005 |
| JP | 2009-119847 A | 6/2009 |
| JP | 6072333 B1 | 2/2017 |

OTHER PUBLICATIONS

Written Opinion by ISA/JP dated Mar. 7, 2017, on PCT/JP2017/001454 (5 pages).

* cited by examiner

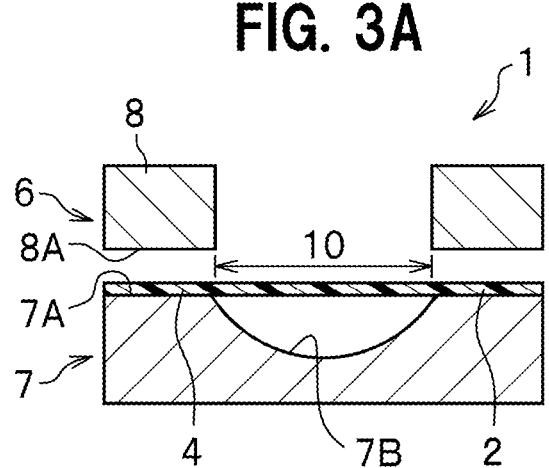
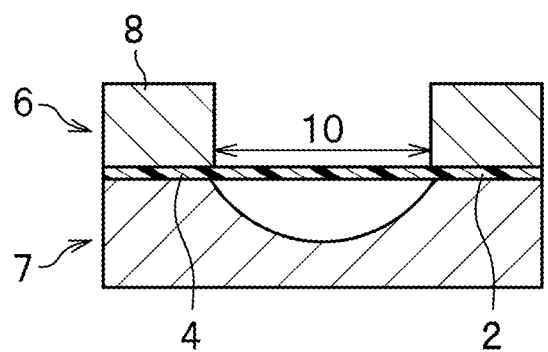
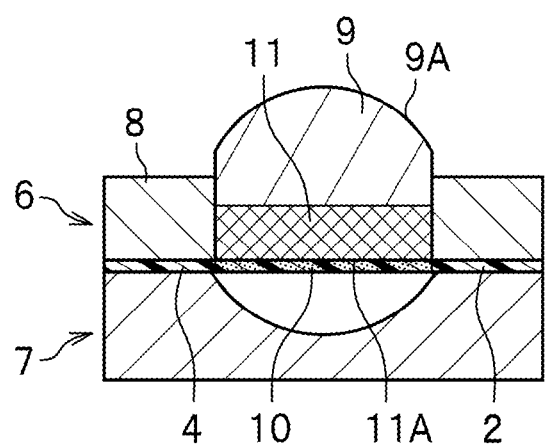
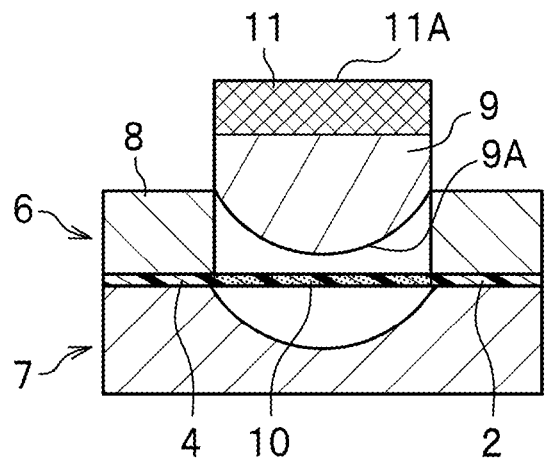
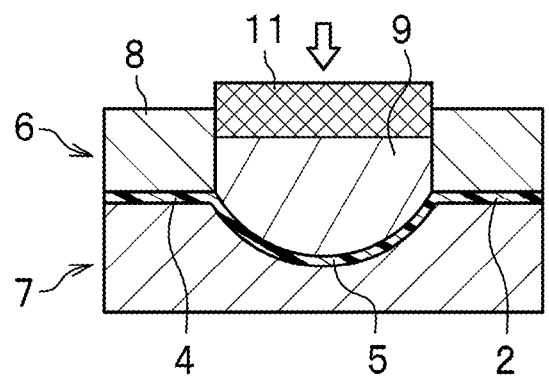
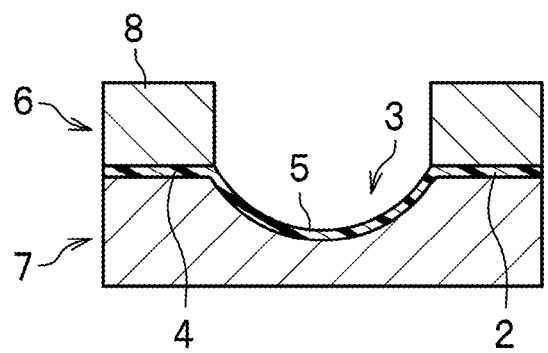

RESIN MOLDING APPARATUS

TECHNICAL FIELD

The present invention relates to a resin molding apparatus.

BACKGROUND ART

A conventional example of molding apparatuses for thermoplastic resin sheets is described in Patent Literature 1. In the disclosure of Patent Literature 1, heat shield panels are provided between heaters, and in the process of heating a thermoplastic resin sheet with heaters, the entire thermoplastic resin sheet is uniformly heated by controlling the vertical positions of the heat shield panels.

CITATION LIST

Patent Literature

Patent Literature 1: JP2005-125534A

SUMMARY OF INVENTION

Technical Problem (1) In order to press a thermoplastic resin sheet composed of a composite material of a thermoplastic resin and reinforcement fibers such as glass or carbon fibers, formability of the thermoplastic resin sheet is improved by heating the thermoplastic resin sheet to melt a resin binding the reinforcement fibers and to lower mechanical properties of the material. However, when a resin is melted, reinforcement fibers decompress and springback is caused. Therefore, there is a problem that physical properties (mechanical properties) of a material cannot be restored unless a product is pressed to the initial thickness at the end of pressing.

(2) When pressing a thermoplastic resin sheet that is to be pressed into a molded product having: a flat section with a uniform thickness; and a concave-convex section continuously extending from the flat section and is pressed by the concave-convex surface of a metal die in a direction in that the metal die moves, a material of the flat section is pulled to the concave-convex section if the entire thermoplastic resin sheet is uniformly heated as disclosed in Patent Literature 1. The flat section may be thereby short of the material. As a countermeasure therefor, a thickness of the flat section may be previously set to be greater than a thickness of the concave-convex section before pressing. However, in such a case, a material of the flat section is far more than a material of the concave-convex section and as a result the metal die cannot be closed, causing a hard stop of the metal die.

(3) When heated, thermoplastic resin sheets become much softer than metal and has a high fluidity. When an entire sheet is heated uniformly and is then pressed as described in Patent Literature 1, a material of a flat section is pulled to a concave-convex section, and wrinkles may occur in the flat section. A material of the wrinkles is far more than other a material of the rest parts if the wrinkles are concentrated in a fold, which results in a metal die being not able to be closed. This may cause a hard stop even in this case.

The present invention was designed to solve the aforementioned problems, and an objective thereof is to provide a resin molding apparatus capable of reducing hard stops of a metal die when pressing a flat plate-shaped thermoplastic resin sheet into a molded product having a flat section and a concave-convex section continuously extending from the flat section.

Solution to Problem

To solve the above problems, the present invention is a resin molding apparatus including a first metal die and a second metal die which press a flat thermoplastic resin sheet into a molded product. The molded product has a flat section and a concave-convex section continuously extending from the flat section. The resin molding apparatus further has a heater that locally heats a concave-convex molded region, of the thermoplastic resin sheet, that is to be pressed into the concave-convex section when pressing the thermoplastic resin sheet.

Advantageous Effects of Invention

According to the present invention, it is possible to reduce hard stops of metal dies when pressing a flat plate-shaped thermoplastic resin sheet into a molded product having a flat section and a concave-convex section.

BRIEF DESCRIPTION OF DRAWINGS

FIGS. 3A to 3F are operation side views of the resin molding apparatus according to the first embodiment.

DESCRIPTION OF EMBODIMENTS

First Embodiment

Figure 1:
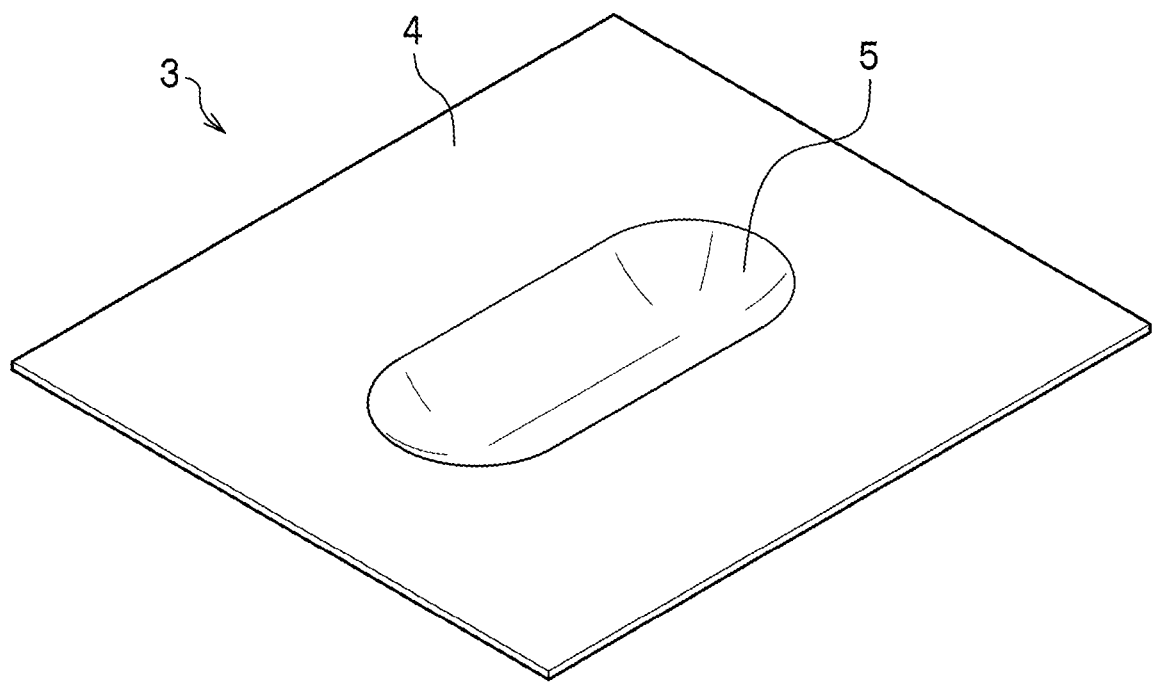
FIG. 1 is a perspective view of the appearance of a molded product example.
Figure 2:
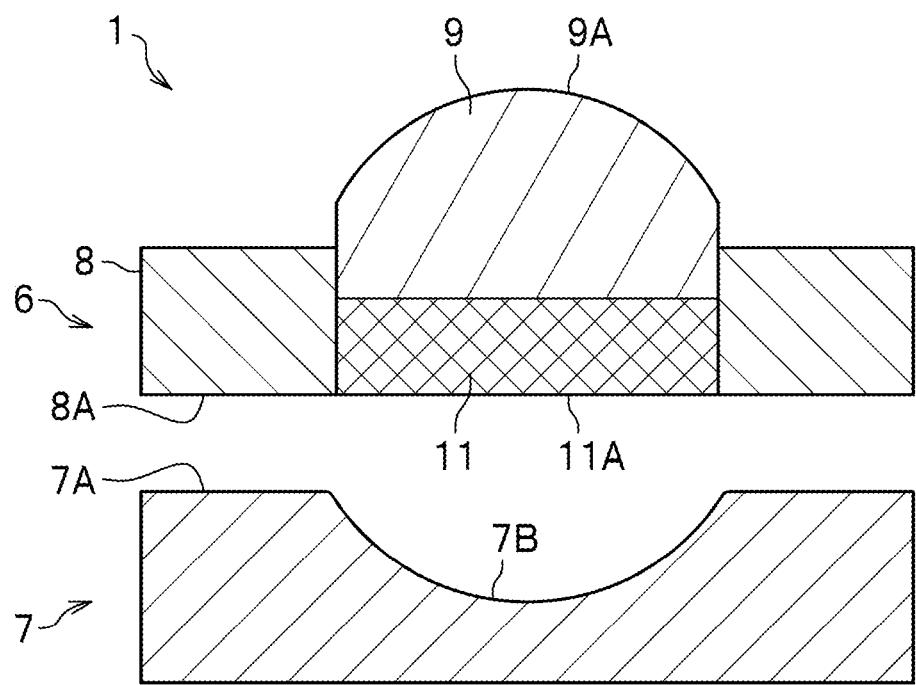
FIG. 2 is a side view of a resin molding apparatus according to a first embodiment.

A first embodiment will be described with reference to FIGS. 1, 2, and 3A to 3F. As illustrated in FIGS. 3A to 3F, a resin molding apparatus 1 includes a first metal die 6 and a second metal die 7 which press a flat thermoplastic resin sheet 2 to be pressed, into a molded product 3. The "flat"

means "shaped in a plate having a uniform thickness" and may mean a curve surface having a slight curvature. The thermoplastic resin sheet 2 which varies in a thickness due to manufacturing variation thereof is included in the present invention. The thermoplastic resin sheet 2 is also called a stampable sheet and is a flat member made of a composite material composed of reinforcement fibers, such as glass or carbon fibers, and thermoplastic resin. The thermoplastic resin sheet 2 is solidified at an ordinary temperature and is softened in order to be pressed when heated to a predetermined temperature.

The molded product 3 has a flat section 4 and a concave-convex section 5 continuously extending from the flat section 4. The flat section 4 has a rectangular shape, for example, and the concave-convex section 5 is has an elliptical hollow which is formed by concaving one of the surfaces, for example. The shape of the concave-convex section 5 is not limited as long as the concave-convex section 5 is deformed in the pressing direction of the first metal die 6 and second metal die 7.

The first metal die 6 is composed of a movable metal die moving in the pressing direction, for example while the second metal die 7 is composed of a fixed metal die. It is certain that the first metal die 6 and second metal die 7 may be both movable metal dies. The first metal die 6 comprises a flat-surface molding portion 8 which has a flat surface 8A, that is to be in contact with the flat section 4; and a concave-convex molding portion 9 having a concave-convex surface 9A, that is to be in contact with the concave-convex section 5, and the flat-surface molding portion 8 is separate from the concave-convex molding portion 9. The concave-convex molding portion 9 is configured as an insert that is inserted through a hole penetrating the flat-surface metal die 8 from a cavity surface to a back surface so as to move in the pressing direction relative to the flat-surface metal die 8. The concave-convex surface 9A is formed at an end, in the pressing direction, of the concave-convex molding portion 9. The second metal die 7 has: a flat surface 7A, that is disposed opposite to the flat surface 8A and is to be in contact with the flat section 4; and a concave-convex surface 7B, that is disposed opposite to the concave-convex surface 9A and is to be in contact with a region, of the thermoplastic sheet 2, that is to be pressed into the concave-convex section 5.

The resin molding apparatus 1 includes a heater 11 that locally heats a concave-convex molded region 10, of the thermoplastic resin sheet 2, that is to be pressed into the concave-convex section 5 when pressing the thermoplastic resin sheet 2. The heater 11 is incorporated in the other end of the concave-convex molding portion 9 in the pressing direction. The other end of the concave-convex molding portion 9 in the pressing direction ahas a flat surface, which constitutes a heating surface 11A that heats the concave-convex molded region 10. The heater 11 can be a publicly-known heat source, such as a heat transfer wire.

The aforementioned resin molding apparatus 1 has: a clamping means (a clamping step) to clamp the thermoplastic resin sheet 2 between the flat-surface molding portion 8 and the second metal die 7; a heating means (a heating step) that heats the concave-convex molded region 10 with the heater 11; and a pressing means (a pressing step) that presses the heated concave-convex molded region 10 with the concave-convex molding portion 9.

(Operation)

With reference to FIGS. 3A to 3F, operation of the resin molding apparatus 1 will be described. First, as illustrated in FIG. 3A, in a state where the first metal die 6 is opened, the thermoplastic resin sheet 2 is placed on the second metal die 7 by a not-illustrated transport apparatus. Next, the flat-surface metal die 8 of the first metal die 6 is closed, and as illustrated in FIG. 3B, the thermoplastic resin sheet 2 is clamped between the flat surface 8A of the flat-surface molding portion 8 and the flat surface 7A of the second metal die 7

Next, the concave-convex molding portion 9 starts to move to the thermoplastic resin sheet 2 with the heating surface 11A facing the thermoplastic resin sheet 2, and as illustrated in FIG. 3C, the heater 11 heats the concave-convex molded region 10 with the heating surface 11A in contact with the concave-convex molded region 10. In the concave-convex molded region 10, the resin binding the reinforcement fibers is thereby melted and attain a formability. Herein, a flat-surface region around the concave-convex molded region 10 is heated due to heat conduction. However, the flat-surface region is clamped between the flat surfaces 8A and 7A, which results in heat being released to the flat-surface metal die 8 and second metal die 7. The flat-surface region is therefore not heated as much as the concave-convex molded region 10 is heated.

After the concave-convex molded region 10 is heated for a predetermined time, the concave-convex molding portion 9 moves back and inverts at the back of the first metal die 6. The concave-convex molding portion 9 then starts to move to the thermoplastic resin sheet 2 with the concave-convex surface 9A facing the thermoplastic resin sheet 2 as illustrated in FIG. 3D. The heated concave-convex molded region 10 is pressed by the concave-convex surface 9A of the first metal die 6 and the concave-convex surface 7B of the second metal die 7 as illustrated in FIG. 3E. The concave-convex surface 9A may be heated by the heater 11 as well as the heating surface 11A. This allows the concave-convex molded region 10 to be pressed while being heated by the concave-convex surface 9A, thus improving the moldability. Thereafter, as illustrated in FIG. 3F, the concave-convex molding portion 9 moves back, and the first metal die 6 and second metal die 7 are opened, providing the molded product 3.

As described above, according to the resin molding apparatus 1 including the first metal die 6 and second metal die 7 that press the flat thermoplastic resin sheet 2 into the molded product 3, the molded product 3 has the flat section 4 and the concave-convex section 5, which continuously extends from the flat section 4, and the heater 11 locally heats the concave-convex molded region 10, of the thermoplastic resin sheet 2, that is to be pressed into the concave-convex section 5, when pressing the thermoplastic resin sheet 2. The above configuration provides the following effects.

The flat-surface region of the thermoplastic resin sheet 2 that corresponds to the flat section 4 is not heated, so that a material of the flat section 4 does not soften. This prevents the material of the flat section 4 from being pulled to the concave-convex section 5 when pressing and thereby prevents the problem that material physical properties deteriorate due to a shortage of the material of the flat section 4. Since the material of the flat section 4 does not soften, the flat section 4 does not have wrinkles when pressing, thus solving the problem of hard stops of the metal dies.

The first metal die 6 comprises the flat-surface molding portion 8 which has the flat surface 8A, which is to be in contact with the flat section 4; and the concave-convex molding portion 9 having the concave-convex surface 9A, which is to be in contact with the concave-convex section 5, and the flat-surface molding portion 8 is separate from the concave-convex molding portion 9. The resin molding apparatus 1 has the clamping means to clamp the thermoplastic resin sheet 2 between the flat-surface molding portion 8 and the second metal die 7; the heating means to heat the concave-convex molded region 10 with the heater 11; and the pressing means to press the heated concave-convex molded region 10 with the concave-convex molding portion 9. Such a configuration provides the following effects. The aforementioned configuration and effects are included in the second embodiment described later.

(1) In the clamping step, the unheated thermoplastic resin sheet 2 is clamped between the flat-surface molding portion 8 and the second metal die 7 and this reliably prevents wrinkles from occurring in the flat section 4.

(2) In the heating step, the heater 11 needs to locally heat the concave-convex molded region 10, i.e. the region not interposed and held between the flat-surface metal die 8 and second metal die 7. This facilitates setting and adjustment of the region to be heated, not requiring a complex heating apparatus.

(3) In the heating step, even if heat is conducted to the flat section 4 when heating the concave-convex molded region 10, the heat is released from the flat section 4 to the first metal die 6 and second metal die 7. This prevents the flat section 4 from being heated.

According to a configuration according to which the heater 11 is provided in the concave-convex molding portion 9, the concave-convex molding portion 9 has both the functions of pressing and heating the concave-convex section 5. The resin molding apparatus 1 is thereby simplified. The configuration and effects are also included in the second embodiment described later.

According to the configuration where the heater 11 is provided as the heating surface 11A, on a flat surface different from the concave-convex surface 9A, the heater 11, which has a flat-plate shape, is in contact evenly with and efficiently heat the entire concave-convex molded region 10.

Second Embodiment

Figure 4:
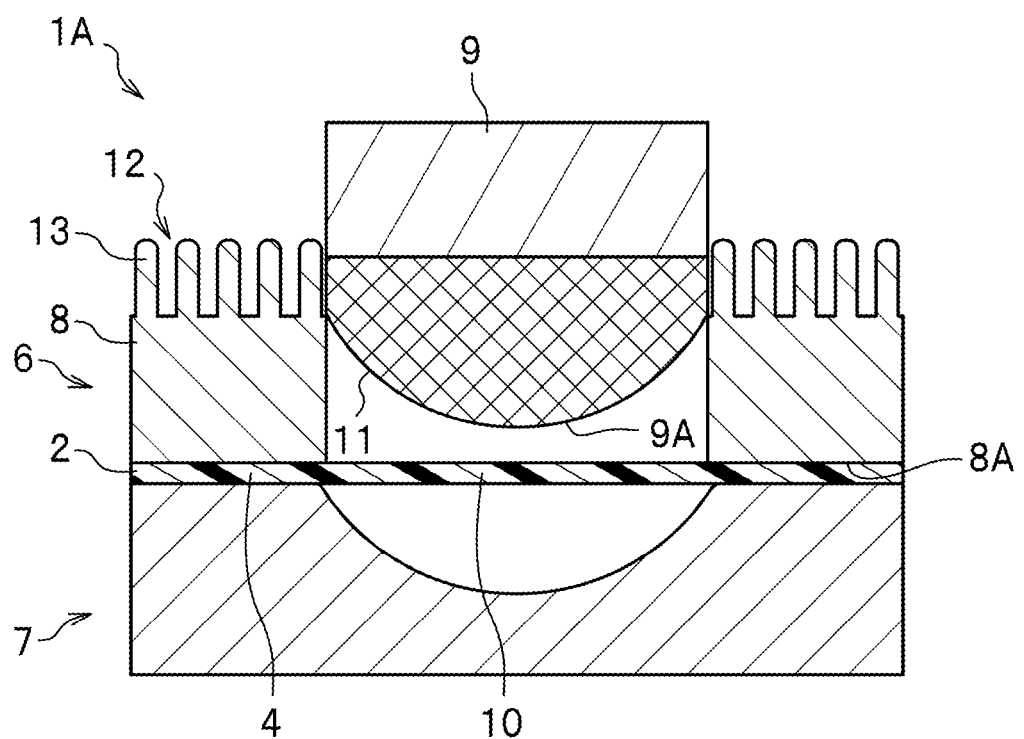
FIG. 4 is a side view of a resin molding apparatus according to a second embodiment.

A second embodiment will be described with reference to FIG. 4. The heater 11 is provided on the concave-convex surface 9A of the concave-convex molding portion 9 in a resin molding apparatus 1A of the second embodiment while the heater 11 is provided on the flat surface, of the concave-convex molding portion 9, that is different from the concave-convex surface 9A of the first embodiment. The resin molding apparatus 1A of the second embodiment has a heat dissipation portion 12 provided at the flat-surface molding portion 8. The heat dissipation portion 12 may be a heat sink 13, which is corrugated and provided at a surface different from the flat surface 8A. The heat dissipation portion 12 is not limited to the heat sink 13 and may be a structure including a cooling pipe through which a cooling medium, such as air or water, flows. The other configuration is the same as that of the first embodiment. The heat dissipation portion 12 can be applied to the flat-surface molding portion 8 of the resin molding apparatus 1 of the first embodiment.

The resin molding apparatus 1A of the second embodiment also has: a clamping means (a clamping step) to clamp the thermoplastic resin sheet 2 between the flat-surface molding portion 8 and the second metal die 7; a heating means (a heating step) to heat the concave-convex molded region 10 with the heater 11; and the pressing means (a pressing step) to press the heated concave-convex molded region 10 with the concave-convex molding portion 9. According to the second embodiment, the concave-convex molded region 10 is pressed by the concave-convex surface 9A while being heated by the concave-convex surface 9A. The heating step and pressing step are thus performed simultaneously.

According to the configuration according to which the heater 11 is provided at the concave-convex surface 9A, the concave-convex surface 9A is able to press the concave-convex molded region 10 while heating the concave-concave molded region 10. This shortens a molding cycle time to press the thermoplastic resin sheet 2 into the molded product 3 and improves productivity. The concave-convex molding portion 9 does not need to be inverted when heating and pressing unlike the first embodiment. This simplifies the structure of the resin molding apparatus 1A, reducing equipment costs.

According to the configuration according to which the heat dissipation portion 12 is provided at the flat-surface molding portion 8, the flat-surface molding portion 8 is capable of efficiently releasing heat through the heat dissipation portion 12. This further prevents the flat section 4 from being heated regarding the effect of the aforementioned (3). The configuration and effects are also included in the first embodiment.

Third Embodiment

A third embodiment will be described with reference to FIGS. 5A to 5E. According to a resin molding apparatus 1B of the third embodiment, the heater 11 is provided to a different unit from the first metal die 6 and second metal die 7. The first metal die 6 has a flat surface 6A, which is to be in contact with the flat section 4, and a concave-convex surface 6B, which is to be in contact with the concave-convex section 5. The flat surface 6A and concave-convex surface 6B are integrally formed. The second metal die 7 has a flat surface 7A, which is disposed opposite to the flat surface 6A and is to be in contact with the flat section 4, and a concave-convex surface 7B, which is disposed opposite to the concave-convex surface 6B and is to be in contact with the concave-convex section 5.

Figure 5A:
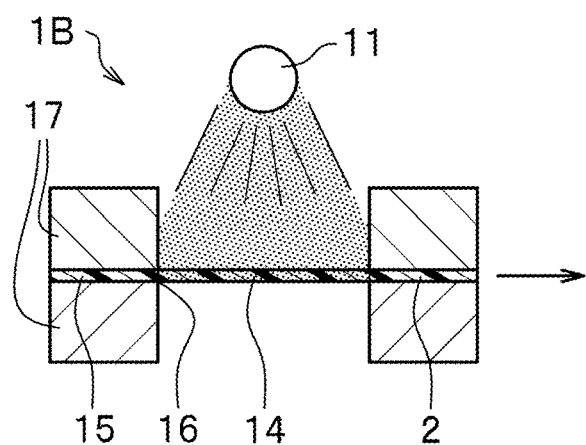
FIGS. 5A to 5D are operation side views of a resin molding apparatus according to a third embodiment.

A boundary 16 between a heated region 14 and a non-heated region 15, which are respectively heated or not heated by the heater 11, is located not at the concave-convex molded region 10 but at the flat section 4. FIG. 5A illustrates the situation where the flat section 4 is clamped by heat insulating members 17 and the concave-convex molded region 10 is heated by the heater 11. A part clamped between the heat insulating members 17 corresponds to the non-heated region 15.

The heated region 14 is supposed to correspond to the entire concave-convex molded region 10. However, since the heater 11 is provided to a different unit from the first metal die 6 and second metal die 7, it is necessary to consider variations in location accuracy when the thermoplastic resin sheet 2 is clamped between the heat insulating members 17, variations in location accuracy when positioning the heated thermoplastic resin sheet 2 on the second metal die 7 after heating, and the like. If a part of the non-heated region 15 is located in the concave-convex molded region 10 due to those variations or the like, for example, the concave-convex molded region 10 is to be pressed, despite the abovementioned part of the non-heated region 15 not being softened. This may cause a molding failure of the concave-convex section 5 or a hard stop of the first metal die 6 and second metal die 7. In order to solve this problem, the boundary 16 between the heated region 14 and non-heated region 15 is located not at the concave-convex molded region 10 but at the flat section 4 according to the present embodiment.

(Operation)

In FIG. 5A, the thermoplastic resin sheet 2 to be pressed is clamped between the heat insulating members 17 while the concave-convex molded region 10 is heated by the heater 11. The heated region 14 includes the entire concave-convex molded region 10 and is wider than the concave-convex molded region 10. In other words, the boundary 16 between the heated region 14 and non-heated region 15 is located not at the concave-convex molded region 10 but at a molded region of the flat section 4.

Figure 5B:
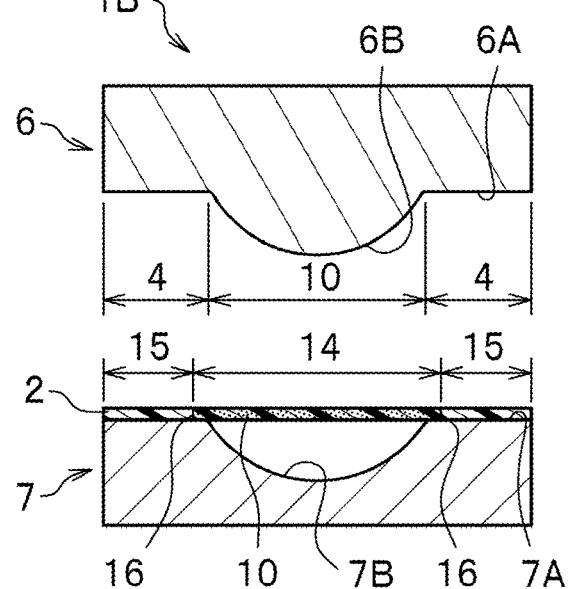
Figure 5C:
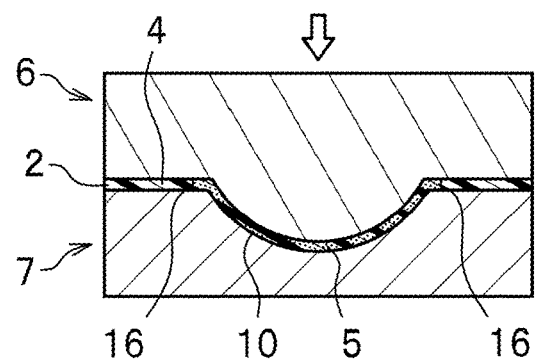
Figure 5D:
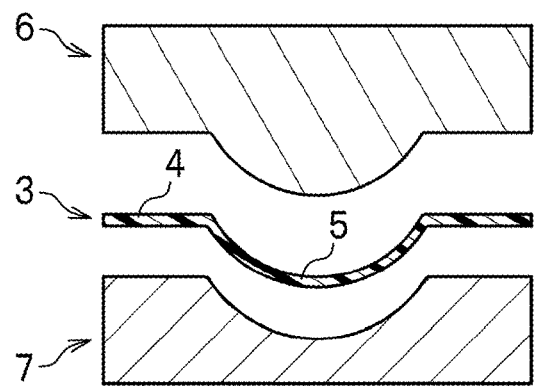

The heated thermoplastic resin sheet 2 is disposed on the second metal die 7 by a not-illustrated transport apparatus as illustrated in FIG. 5B. The boundary 16 between the heated region 14 and non-heated region 15 is located not at the concave-convex molded region 10 but at the flat section 4, which reduces the likelihood that the non-heated region 15 is located so as to overlap the concave-convex surface 6B of the first metal die 6 and the concave-convex surface 7B of the second metal die 7 due to the above-described variations or the like. Subsequently, the first metal die 6 is closed as illustrated in FIG. 5C to press the thermoplastic resin sheet 2 and is then opened as illustrated in FIG. 5D, thus providing the molded product 3.

As described above, the heater 11 is provided to a different unit from the first metal die 6 and second metal die 7, and the boundary 16 between the heated region 14 and non-heated region 15, which are respectively heated or not heated by the heater 11, is located not at the concave-convex molded region 10 but at the flat section 4. Such a configuration provides the following effects.

(1) Even if the first metal die 6 and second metal die 7 are replaced or there are a plurality of first metal dies 6 and second metal dies 7, the heater 11 which is provided to a different unit from the first metal die 6 and second metal die 7 can be used, thus reducing equipment costs.

(2) When a part of the non-heated region 15 is included in the concave-convex molded region 10, the concave-convex molded region 10 is to be pressed, despite the abovementioned part of the non-heated region 15 being not softened, causing a molding failure of the concave-convex section 5 or a hard stop of the first metal die 6 and the second metal die 7. However, locating the boundary 16 at the flat section 4 side allows for variations in positional accuracy of the first metal die 6 and second metal die 7 relative to the thermoplastic resin sheet 2, thus reducing molding failures of the concave-convex section 5 and hard stops of the first metal die 6 and second metal die 7.

Fourth Embodiment

A fourth embodiment will be described with reference to FIGS. 7 and 8.

Figure 6:
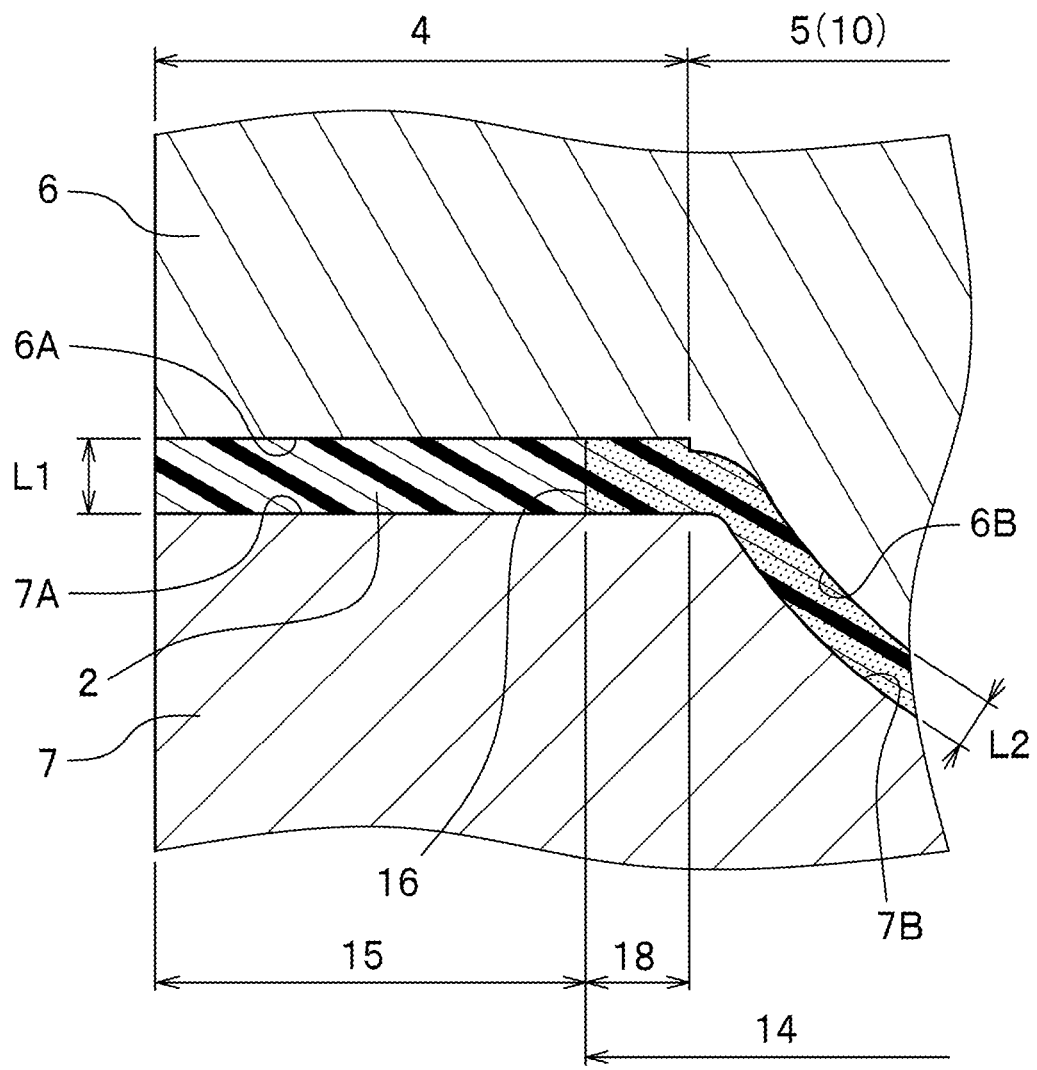
FIG. 6 is a side view illustrating a boundary and therearound between a heated region and a non-heated region when pressing.

With reference to FIG. 6, as described in the third embodiment, a point to note in the case where the boundary 16 between the heated region 14 and non-heated region 15 is located at the flat section 4 side will be first described. In order to prevent the first metal die 6 and second metal die 7 from undergoing a hard stop, a distance L1 between the metal dies between which the flat section 4 is clamped needs to be equal to or longer than a thickness of the thermoplastic resin sheet 2 since the non-heated region 15 does not deform when pressing. In a case where a distance L2 between the metal dies between which the concave-convex section 5 is clamped is set to be equal to the distance L1, when the thermoplastic resin sheet 2 is enlarged at the concave-convex section 5, an amount of a material per unit area is reduced, causing a lack of a pressing force. This leads to deterioration of mechanical properties of the molded product. On the other hand, when the distance L2 is set to be shorter than the distance L1, the concave-convex molded region 10, that is to be pressed into the concave-convex section 5 is compressed so as to be thinner than a thickness of the thermoplastic resin sheet 2 before being pressed, so that a material density per unit volume can be increased to be comparable to the initial state. This prevents deterioration of mechanical properties.

When the boundary 16 between the heated region 14 and non-heated region 15 is located at the flat section 4, as illustrated in FIG. 6, a part of the heated region 14 is located at the flat section 4. This part is a non-compressed heated region 18, which is not compressed by the first metal die 6 and second metal die and 7. The non-compressed heated region 18 is enlarged to the concave-convex section 5 when pressing, and a decrease in amount of a material per area may deteriorate mechanical properties. The fourth embodiment is an embodiment to deal with this problem of the non-compressed heated region 18.

Figure 7:
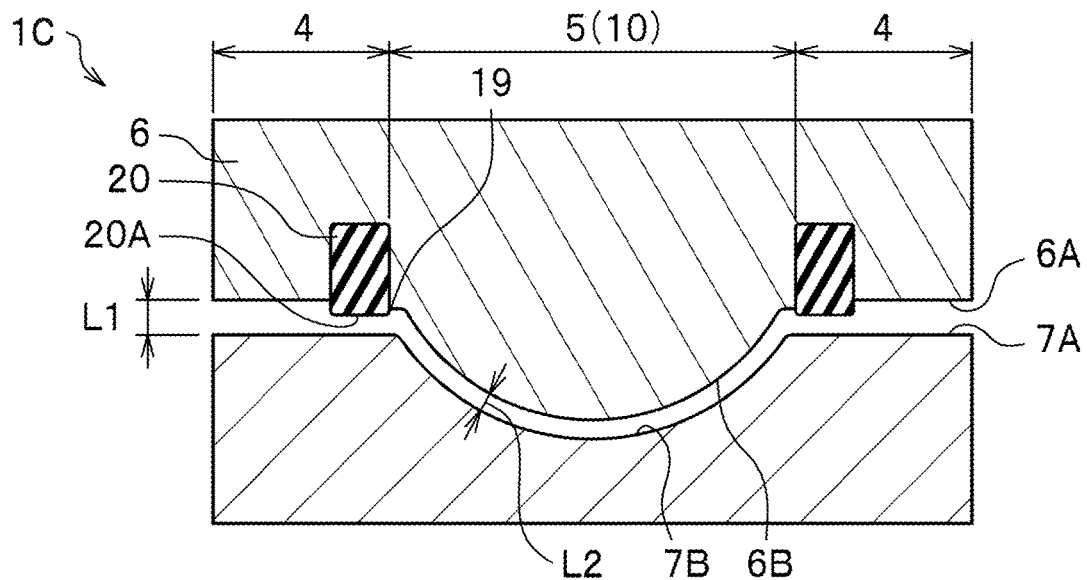
FIG. 7 is a side view of a resin molding apparatus according to a fourth embodiment.
Figure 8A:
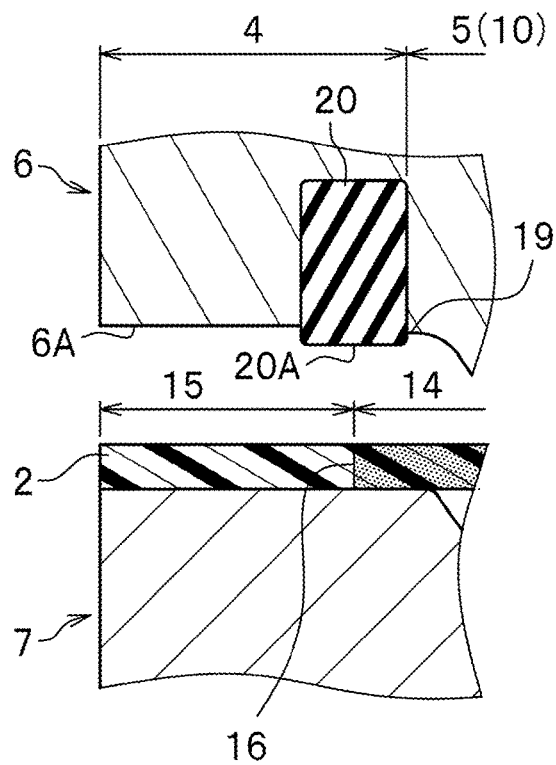
FIGS. 8A and 8B are operation side views of a resin molding apparatus according to the fourth embodiment.
Figure 8B:
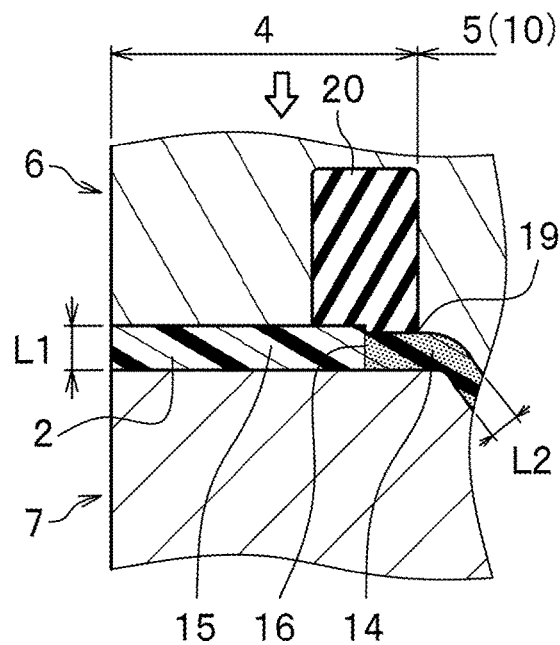

With reference to FIGS. 7, 8A, and 8B, a resin molding apparatus 1C of the fourth embodiment includes the first metal die 6 and second metal die 7. The first metal die 6 includes the flat surface 6A and concave-convex surface 6B, which are integrally formed. The flat surface 6A is to be in contact with the flat section 4, and the concave-convex surface 6B is to be in contact with the concave-convex section 5. The second metal die 7 has: the flat surface 7A, which is disposed opposite to the flat surface 6A and is to be in contact with the flat section 4; and the concave-convex surface 7B, which is disposed opposite to the concave-convex surface 6B and is to be in contact with the concave-convex section 5.

As for distances between the first metal die 6 and the second metal die 7, when the first metal die 6 and the second metal die 7 are closed, as shown in FIG. 7, the distance L2 between the concave-convex surfaces 6B, 7B is set to be shorter than the distance L1 between the flat surfaces 6A, 7A. The distance L1 is set to be substantially equal to or longer than the thickness of the thermoplastic resin sheet 2 taking account of variations in the thickness of the thermoplastic resin sheet 2 to be pressed. The distance L2 is set to be smaller than the thickness of the thermoplastic resin sheet 2 to be pressed. The thickness of the molded concave-convex section 5 is therefore thinner than that of the thermoplastic resin sheet 2 to be pressed. The first metal die 6 has an elastic body 20, which extends to the flat surface 6A from a boundary 19 between the flat surface 6A and concave-convex surface 6B and protrudes from the flat surface 6A toward the second metal die 7. The elastic body 20 has a rectangular side-section shape having a protruding end face 20A, which is parallel to the flat surface 6A, for example. The elastic body 20 protrudes from the concave-convex surface 6B toward the second metal die 7 according to the fourth embodiment although the protruding end face 20A may be flush with the concave-convex surface 6B. Thereby, there is difference in a level between the protruding end face 20A and the concave-convex surface 6B. As shown in FIG. 8A and FIG. 8B, the elastic body 20 is disposed so as to press the heated region 14 and non-heated region 15.

(Operation)

FIG. 8A illustrates a state, before pressing, in which the thermoplastic resin sheet 2 is disposed on the second metal die 7 after heating. The elastic body 20 is disposed so as to press the heated region 14 and non-heated region 15 of the thermoplastic resin sheet 2. When the first metal die 6 is closed as illustrated in FIG. 8B, a part corresponding to the non-compressed heated region 18 illustrated in FIG. 6 is pressed by elastic restoring force of the compressed and deformed elastic body 20. The pressing force thereof is comparable to that applied to the concave-convex molded region 10, that is to be pressed into the concave-convex section 5 having the thickness set to be the distance L2. The part of the elastic body 20 that is in contact with the non-heated region 15 is compressed and deformed to the level of the flat surface 6A, so that the flat section 4 does not receive excessive pressing force from the elastic body 20.

Figure 9:
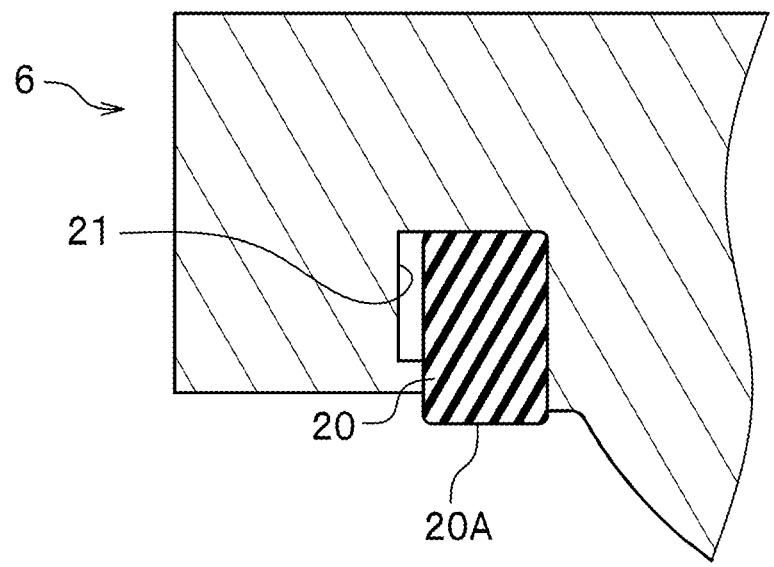
FIG. 9 is a side view illustrating an example modification of the resin molding apparatus according to the fourth embodiment.

A material of the elastic body 20 is, for example, a rubber material and is preferably a heat-resistant rubber or the like. The elastic body 20 preferably has a high compressibility and is preferably made of a foamed material in particular. As illustrated in FIG. 9, a space 21 may be formed in the first metal die 6 in order to accommodate the compressed and deformed elastic body 20 in the first second metal die 6.

As described above, the first metal die 6 has the flat surface 6A, which is to be in contact with the flat section 4, and the concave-convex surface 6B, which is to be in contact with the concave-convex section 5. As for distances between the first metal die 6 and second metal die 7 when the first metal die 6 and second metal die 7 are closed, the distance L2 between the concave-convex surfaces 6B and 7B is set to be shorter than the distance L1 between the flat surfaces 6A an 7A. The first metal die 6 has the elastic body 20, which extends to the flat surface 6A from the boundary 19 between the flat surface 6A and concave-convex surface 6B and protruding from the flat surface 6A toward the second metal die 7. The elastic body 20 is disposed so as to press the heated region 14 and non-heated region 15 of the thermoplastic resin sheet 2. Such a configuration provides the following effects.

(1) When the distance L2 is set to be shorter than the distance L1, the concave-convex molded region 10, that is to be pressed into the concave-convex section 5 is compressed to be thinner than the thickness of the thermoplastic resin sheet 2 before being pressed, so that a material density per unit volume of the pressed thermoplastic resin sheet 2 can be increased to be comparable to the initial state. This prevents deterioration of mechanical properties.

(2) A part of the heated region 14, that is to be pressed into the flat section 4 can be pressed by the elastic restoring force of the compressed and deformed elastic body 20. The pressing force thereof is comparable to that applied to the concave-convex section 5 with the thickness equal to the distance L2. This prevents deterioration of mechanical properties of the part of the heated region 14 of the flat section 4.

(3) The elastic body 20 is disposed so as to press the heated region 14 and non-heated region 15. This allows the part of the heated region 14 of the flat section 4 to be reliably pressed by the elastic body 20 even if the position of the boundary 16 between the heated region 14 and non-heated regions 15 is varied. Since the elastic body 20 is compressed and deformed, a part of the non-heated region 15 of the flat section 4 does not receive excessive pressing force.

According to the configuration, the elastic body 20 protrudes from the concave-convex surface 6B toward the second metal die 7 at the boundary 19 between the flat surface 6A and concave-convex surface 6B, the protruding end face 20A of the elastic body 20 can be close to a level nearly equal to the concave-convex surface 6B when the elastic body 20 is compressed. This reduces difference in mechanical properties between a part of the heated region 14, pressed by the elastic body 20, of the flat section 4 pressed by the elastic body 20 and the concave-convex section 5 pressed by the concave-convex surfaces 6B and 7B with the distance L2 therebetween.

Fifth Embodiment

Figure 10:
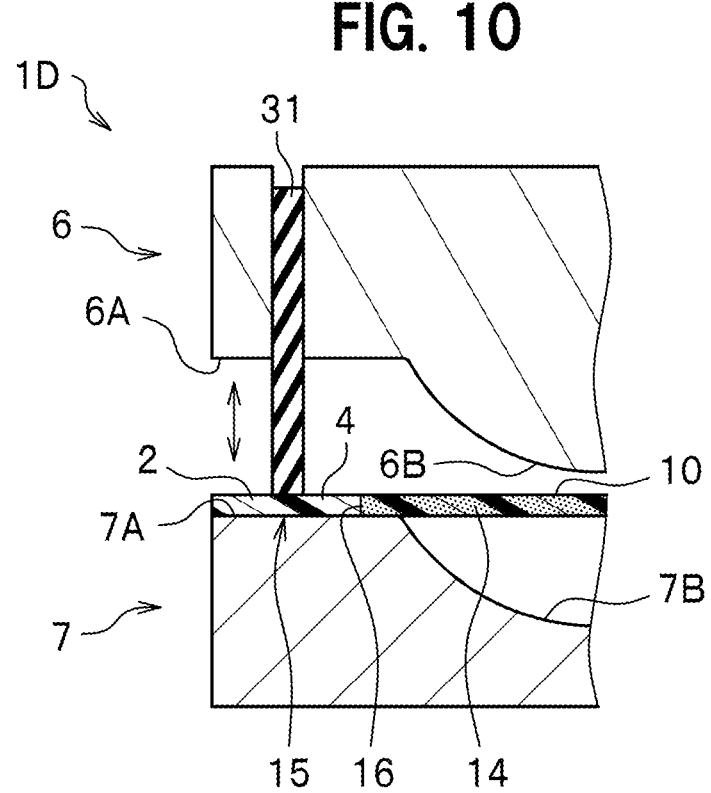
FIG. 10 is a side view of a resin molding apparatus according to a fifth embodiment.

A fifth embodiment will be described with reference to FIG. 10. A resin molding apparatus 1D of the fifth embodiment has a positioning section 31 that positions the thermoplastic resin sheet 2 with respect to the first metal die 6 and second metal die 7. The positioning section 31 is to be in contact with the non-heated region 15 of the thermoplastic resin sheet 2. The configurations of the first metal die 6 and second metal die 7 can be the same as those of the third and fourth embodiments, and the description thereof is omitted.

The positioning section 31 has a positioning pin attached to the first metal die 6 so as to move in the pressing direction relative to the first metal die 6, for example. The positioning section 31 is inserted through a through-hole formed by boring from the cavity surface to the back surface of the first metal die 6, and a tip thereof protruded from the cavity surface is in contact with the non-heated region 15 of the thermoplastic resin sheet 2 placed on the second metal die 7 in order to position the thermoplastic resin sheet 2 with respect to the second metal die 7.

As described above, the positioning section 31, which positions the thermoplastic resin sheet 2 with respect to the first metal die 6 and the second metal die 7, is in contact with the non-heated region 15 of the thermoplastic resin sheet 2. Such a configuration enables pressing with the thermoplastic resin sheet 2 stably positioned. When the positioning section 31 is configured to be in contact with the non-heated region 15, heat of the heated region 14 is prevented from being transferred to the positioning section 31, reducing a decrease in temperature of the heated region 14.

Sixth Embodiment

Figure 11A:
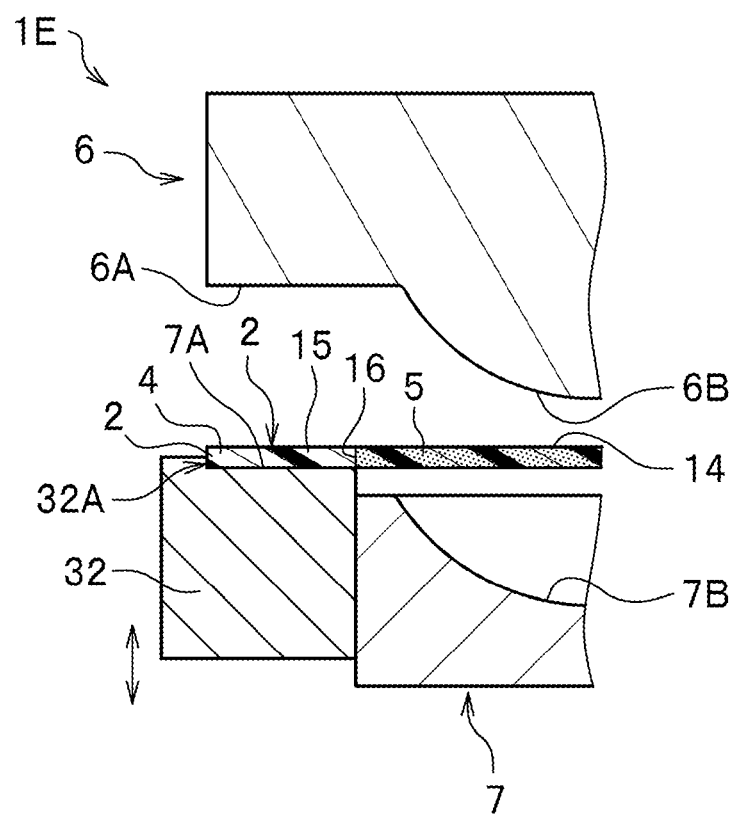
FIGS. 11A and 11B are operation side views of a resin molding apparatus according to a sixth embodiment.
Figure 11B:
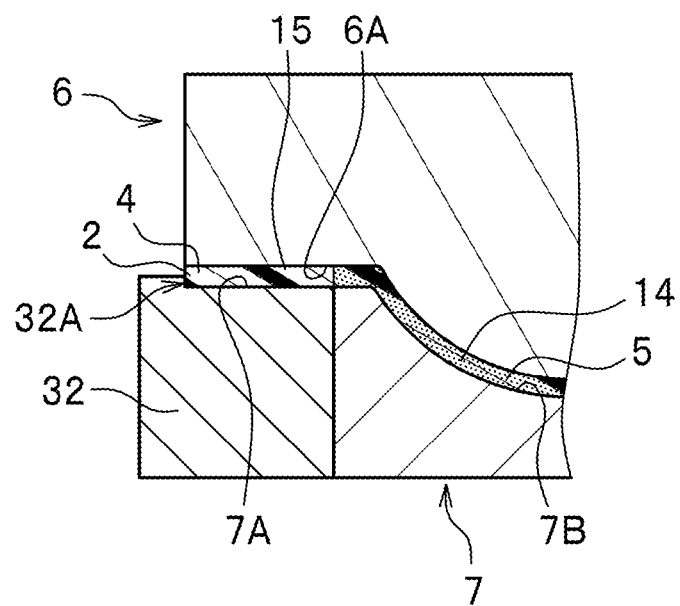

A sixth embodiment will be described with reference to FIG. 11A and FIG. 11B. A resin molding apparatus 1E of the sixth embodiment comprises a lifter 32 that lifts the thermoplastic resin sheet 2 so as to have the heated region 14 apart from the first metal die 6 and the second metal die 7 before pressing. The lifter 32 is in contact with the non-heated region 15 of the thermoplastic resin sheet 2. The configurations of the first metal die 6 and the second metal die 7 may be the same as those of the third and fourth embodiments, and the description thereof is omitted.

The lifter 32 is, for example, attached to the second metal die 7 so as to move in the pressing direction. The lifter 32 constitutes a part of the second metal die 7. The lifter 32 is moved up relative to the second metal die 7 as illustrated in FIG. 11A before pressing so as to have the heated region 14 apart from the second metal die 7 (also from the first metal die 6). When pressing, the lifter 32 moves down as illustrated in FIG. 11B. An upper surface of the lifter 32 serves as the flat surface 7A of the second metal die 7 and the non-heated region 15 of the thermoplastic resin sheet 2 is clamped between the flat surface 7A of the second metal die 7 and the flat surface 6A of the first metal die 6. In the upper surface of the lifter 32, a step 32A is provided to be in contact with an end of the thermoplastic resin sheet 2 for positioning.

As described above, the resin molding apparatus 1E comprises the lifter 32, which lifts the thermoplastic resin sheet 2 so as to have the heated region 14 apart from the first metal die 6 and the second metal die 7 before pressing. The lifter 32 is in contact with the non-heated region 15 of the thermoplastic resin sheet 2. Such a configuration prevents heat of the heated region 14 from being transferred to the first metal die 6 and the second metal die 7 and lifter 32, reducing a decrease in temperature of the heated region 14.

Seventh Embodiment

Figure 12:
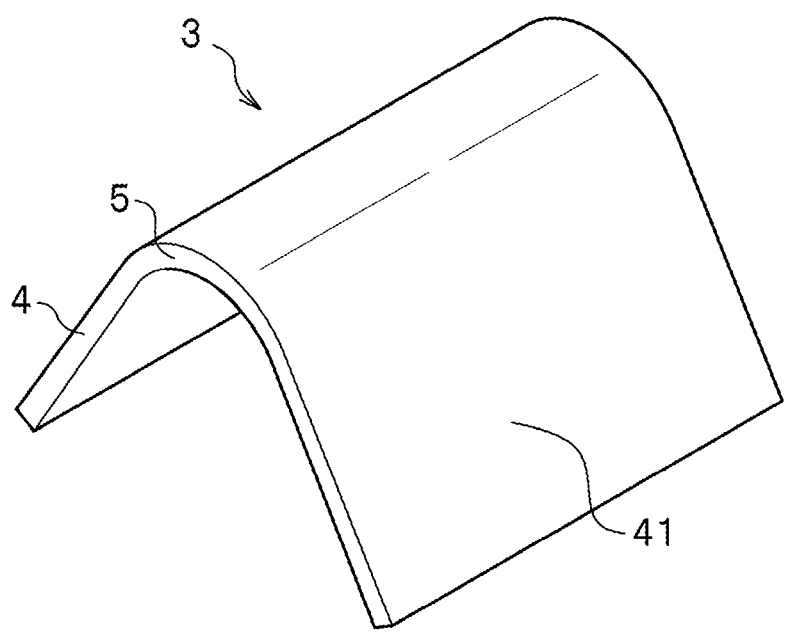
FIG. 12 is a perspective view of the appearance of a molded product example having an intersecting flat section.

A seventh embodiment will be described with reference to FIG. 12, FIG. 13A to FIG. 13D, FIG. 14A, and FIG. 14B. A resin molding apparatus 1F of the seventh embodiment relates to an apparatus to press the thermoplastic resin sheet 2 into the molded product 3 which has an intersecting flat section 41 that intersects the flat section 4 and has the concave-convex section 5 continuously extending from the intersecting flat section 41 and the flat section 4 as illustrated in FIG. 12. The molded product 3 illustrated in FIG. 12 has a substantially V-like shape with the concave-convex section 5 having a curve surface. The resin molding apparatus 1F has a pre-bending mechanism 42 that previously, before pressing, bends as a bent portion the concave-convex section 5 continuously extending from the flat section 4 and the intersecting flat section 41.

As illustrated in FIG. 13A to FIG. 13D, the heater 11 is provided to a different unit from the first metal die 6 and the second metal die 7. The cavity surface of the first metal die 6 has: flat surfaces 6A, which is to be in contact with the flat section 4 and intersecting flat section 41; and a concave-convex surface 6B, which is concaved and is to be in contact with the concave-convex section 5. The second metal die 7 has: the flat surfaces 7A, which are is disposed opposite to the respective flat surfaces 6A and is to be in contact with the flat section 4 and crossing flat section 41; and the concave-convex surface 7B, which is disposed opposite to the concave-convex surface 6B and is to be in contact with the concave-convex section 5.

The pre-bending mechanism 42 can be a transport apparatus that transports the thermoplastic resin sheet 2 to be pressed to the pressing position for the first metal die 6 and the second metal die 7. The transport apparatus includes suction pads 43 that vacuum sucks the upper surface of the non-heated region 15 of the thermoplastic resin sheet 2, for example. The pre-bending mechanism 42 includes the suction pads 43 and a moving arm (not illustrated) that is able to press the suction pads 43 against the respective flat surfaces 7A of the second metal die 7. Using the pre-bending mechanism 42, the suction pads 43 are rotated and moved downward by the moving arm, and the concave-convex section 5 is formed by bending the heated region 14 along the concave-convex surface 7B of the second metal die 7. The flat section 4 and the intersecting flat section 41 of the non-heated region 15 of the thermoplastic resin sheet 2 are pressed against the flat surfaces 7A of the second metal die 7.

(Operation)

Figure 13A:
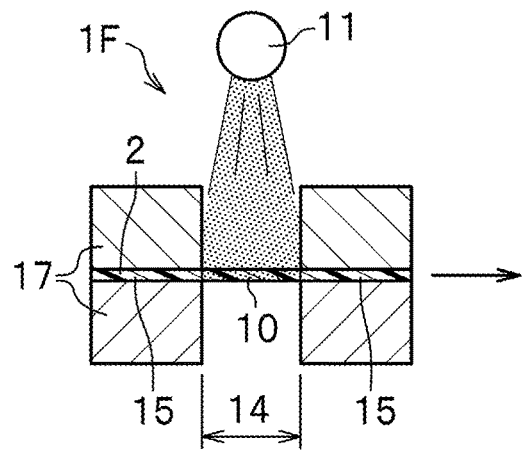
FIGS. 13A to 13D are operation side views of a resin molding apparatus according to a seventh embodiment.

In FIG. 13A, the thermoplastic resin sheet 2 to be pressed is clamped between heat insulating members 17 while the concave-convex molded region 10 is heated by the heater 11. According to this embodiment, the heated region 14 includes the entire concave-convex molded region 10 and is set to be wider than the concave-convex molded region 10.

Figure 13B:
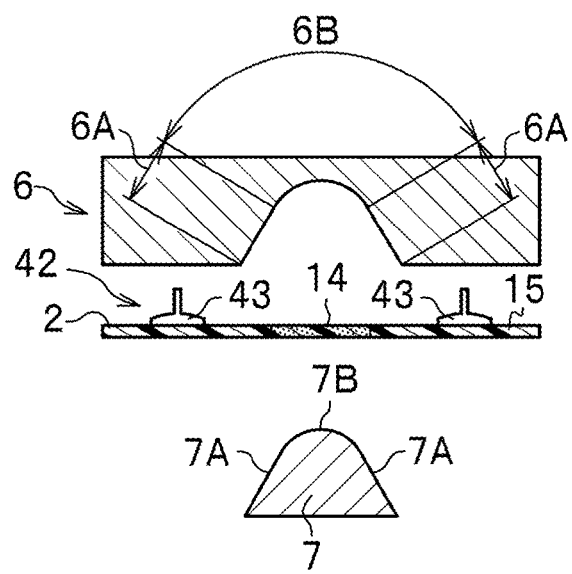
Figure 13C:
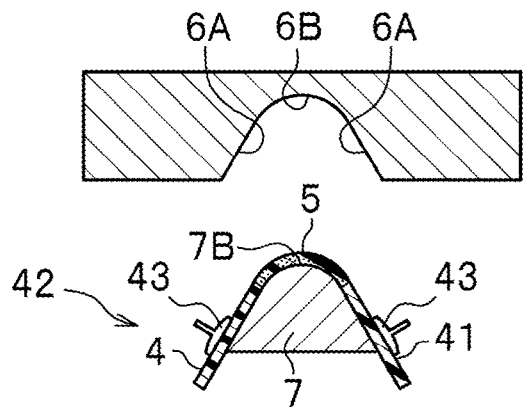
Figure 13D:
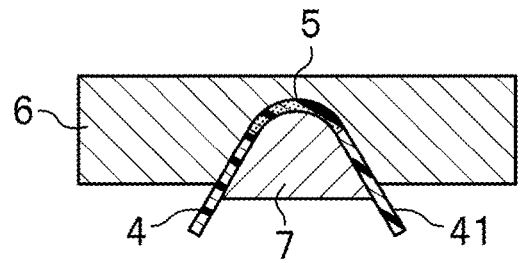

The heated thermoplastic resin sheet 2 is transported to above the second metal die 7 as illustrated in FIG. 13B, with the non-heated regions 15 sucked by the suction pads 43 of the transport apparatus. Next, the heated region 14, that is to be pressed into the concave-convex section 5, is brought into contact with the concave-convex surface 7B of the second metal die 7, and the heated region 14, that is to be pressed into the concave-convex section 5, is then bent as a bent portion by the suction pads 43 as the pre-bending mechanism 42 so as to have the flat section 4 and intersecting flat section 41 be in contact with the respective flat surfaces 7A as illustrated in FIG. 13C. As illustrated in FIG. 13D, the first metal die 6 and the second metal die 7 are then closed to press, which results in the concave-convex section 5 being formed by pressing.

Figure 14A:
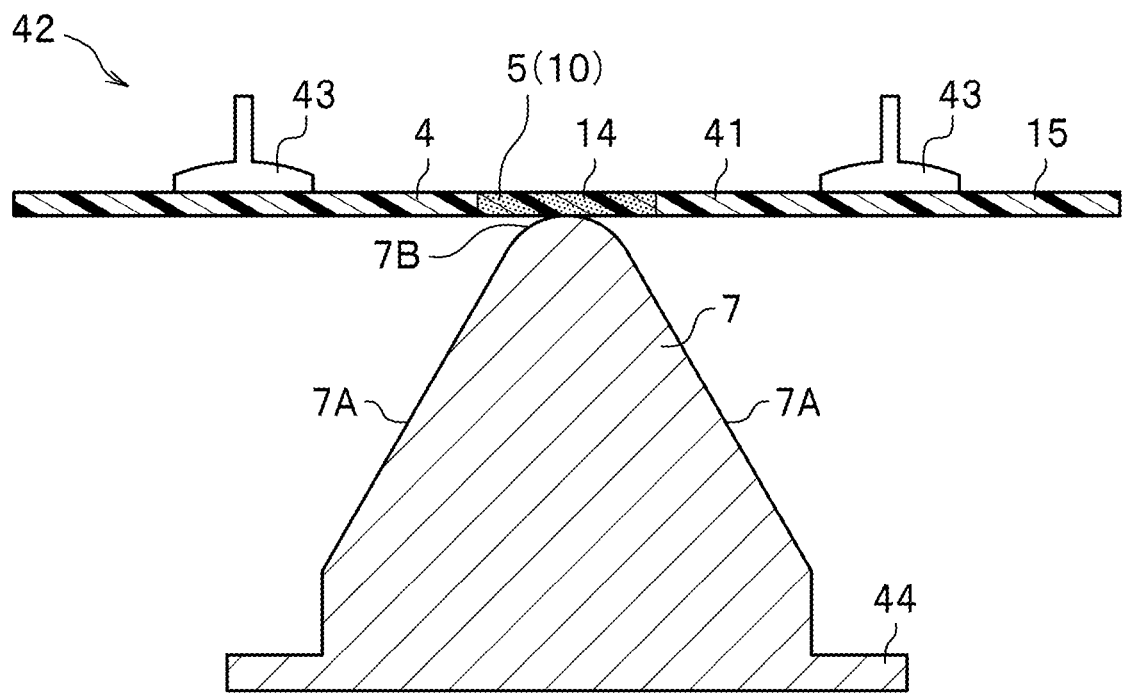
FIGS. 14A and 14B are operation side views illustrating a modification of the resin molding apparatus according to the seventh embodiment.
Figure 14B:
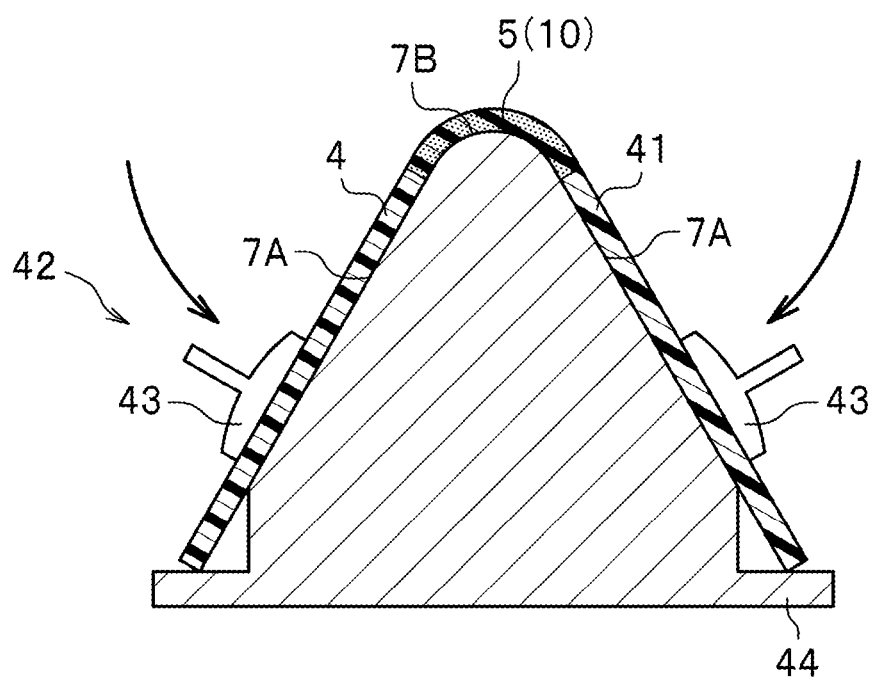

As illustrated in FIG. 14A and FIG. 14B, the second metal die 7 may has a positioning protrusion 44 that is to be in contact with ends of the flat section 4 and intersecting flat section 41 when pre-bending. This prevents from mispositioning the non-heated region 15 and the heated region 14, that is to be pressed into the molded product 3, relative to the second metal die 7 when pre-bending.

As described above, the molded product 3 has the intersecting flat section 41, that intersects the flat section 4, and the concave-convex section 5 continuously extends from the flat section 4 and the intersecting flat section 41.

The resin molding apparatus 1F has the pre-bending mechanism 42, that previously, before pressing, bends as a bent portion the concave-convex section 5 continuously extending from the flat section 4 and intersecting flat section 41. Such a configuration provides the following effect.

The pre-bending mechanism 42 perform positioning of one of the metal dies (the second metal die 7) and the intersecting flat section 41 before pressing, having the concave-convex molded region 10 stably positioned. Therefore, the concave-convex molded region 10 is not mispositioned and is stably pressed.

EXPLANATION OF REFERENCES 1, 1A-1F Resin molding apparatus
2 Thermoplastic resin sheet
3 Molded product
4 Flat section
5 Concave-convex section
6 First metal die
6A Flat surface
6B Concave-convex surface
7 Second metal die
7A Flat surface
7B Concave-convex surface
8 Flat-surface molding portion
9 Concave-convex molding portion
10 Concave-convex molded region
11 Heater
11A Heating surface
14 Heated region
15 Non-heated region
16 Boundary
18 Non-compressed heated region
19 Boundary
20 Elastic body
31 Positioning section
32 Lifter
41 Intersecting flat section
42 Pre-bending mechanism
43 Suction pads

The invention claimed is:

1. A resin molding apparatus comprising:
a first metal die and a second metal die configured to relatively move to press a flat thermoplastic resin sheet into a molded product having a flat section and a concave-convex section continuously extending from the flat section; and a heater configured to locally heat a concave-convex molded region, of the thermoplastic resin sheet, that is pressed into the concave-convex section when the thermoplastic resin sheet is pressed, wherein the heater is separate from the first metal die and the second metal die, wherein the flat thermoplastic resin includes a boundary between a heated region heated by the heater and a non-heated region not heated by the heater that is positioned not at the concave-convex molded region but at the flat section, wherein the first metal die has a flat surface configured to be in contact with the flat section and a concave-convex surface configured to be in contact with the concave-convex section, wherein a distance between the concave-convex surface of the first metal die and a corresponding surface of the second metal die is shorter than a distance between the flat surface of the first metal die and a corresponding surface of the second metal die when the first metal die and the second metal die are closed, and wherein the first metal die has an elastic body which extends to the flat surface from a boundary between the flat surface and the concave-convex surface, protrudes from the flat surface toward the second metal die, and is disposed and configured to press the heated region and the non-heated region of the thermoplastic resin sheet.

2. The resin molding apparatus according to claim 1, wherein the first metal die includes a flat-surface molding portion having a flat surface configured to be in contact with the flat section and a concave-convex molding portion having a concave-convex surface configured to be in contact with the concave-convex section, and the flat surface molding portion is separate from the concave-convex molding portion, wherein:

the flat-surface molding portion and the second metal die are configured to clamp the thermoplastic resin sheet;

the heater is configured to heat the concave-convex molded region; and, the concave-convex molding portion is configured to press the heated concave-convex molded region.

3. The resin molding apparatus according to claim 2:
wherein the heater is provided in the concave-convex molding portion.

4. The resin molding apparatus according to claim 3:
wherein the heater is provided on a flat surface, different from the concave-convex surface, of the concave-convex molding portion.

5. The resin molding apparatus according to claim 3:
wherein the heater is provided on the concave-convex surface.

6. The resin molding apparatus according to claim 2:
wherein the flat-surface molding portion has a heat dissipation portion.

7. The resin molding apparatus according to claim 1:
wherein the elastic body protrudes toward the second metal die from the concave-convex surface at the boundary between the flat surface and the concave-convex surface.

8. The resin molding apparatus according to claim claim 1, further comprising:

a positioning pin attached to the first metal die and configured to move in a pressing direction relative to the first metal die, wherein the positioning pin is inserted through a through-hole formed by boring from a cavity surface to a back surface of the first metal die, wherein the positioning pin is configured to position the thermoplastic resin sheet with respect to the first metal die and the second metal die, and wherein the positioning pin is configured to be in contact with the non-heated region of the thermoplastic resin sheet.

9. The resin molding apparatus according to claim 1, further comprising:

a lift die attached to the second metal die and configured to move relative to the second metal die in a pressing direction, wherein the lift die is configured to lift the thermoplastic resin sheet and to have the heated region positioned apart from the first metal die and the second metal die before pressing, and wherein the lift die is configured to be in contact with the non-heated region of the thermoplastic resin sheet.

10. A resin molding apparatus comprising:

a first metal die and a second metal die configured to relatively move to press a flat thermoplastic resin sheet into a molded product having a flat section and a concave-convex section continuously extending from the flat section; and a heater configured to locally heat a concave-convex molded region, of the thermoplastic resin sheet, that is pressed into the concave-convex section when the thermoplastic resin sheet is pressed, wherein the heater is separate from the first metal die and the second metal die, wherein the flat thermoplastic resin includes a boundary between a heated region heated by the heater and a non-heated region not heated by the heater that is positioned not at the concave-convex molded region but at the flat section, and wherein the molded product has an intersecting flat section intersecting the flat section through the concave-convex section and the concave-convex section continuously extends from the flat section and the intersecting flat section, further comprising:

a pre-bending mechanism including suction pads and a moving arm configured to press the suction pads against respective flat surfaces of the second metal die, wherein the pre-bending mechanism is configured to previously, before press molding, bend as a bent portion the concave-convex section continuously extending from the flat section and the intersecting flat section.

11. The resin molding apparatus according to claim 3:
wherein the flat-surface molding portion has a heat dissipation portion.

12. The resin molding apparatus according to claim 4:
wherein the flat-surface molding portion has a heat dissipation portion.

13. The resin molding apparatus according to claim 5:
wherein the flat-surface molding portion has a heat dissipation portion.

14. The resin molding apparatus according to claim 7, further comprising:

a positioning pin attached to the first metal die and configured to move in a pressing direction relative to the first metal die, wherein the positioning pin is inserted through a through-hole formed by boring from a cavity surface to a back surface of the first metal die, wherein the positioning pin is configured to position the thermoplastic resin sheet with respect to the first metal die and the second metal die, and wherein the positioning pin is configured to be in contact with the non-heated region of the thermoplastic resin sheet.

15. The resin molding apparatus according to claim 7, further comprising:

a lift die attached to the second metal die and configured to move relative to the second metal die in a pressing direction, wherein the lift die is configured to lift the thermoplastic resin sheet and to have the heated region positioned apart from the first metal die and the second metal die before pressing, and wherein the lift die is configured to be in contact with the non-heated region of the thermoplastic resin sheet.

16. The resin molding apparatus according to claim 8, further comprising:

a lift die attached to the second metal die and configured to move relative to the second metal die in a pressing direction, wherein the lift die is configured to lift the thermoplastic resin sheet and to have the heated region positioned apart from the first metal die and the second metal die before pressing, and wherein the lift die is configured to be in contact with the non-heated region of the thermoplastic resin sheet.

* * * * *